United States Patent [19]

Stanfield

[11] Patent Number: 5,064,236
[45] Date of Patent: Nov. 12, 1991

[54] DISH CARRIER

[76] Inventor: John Stanfield, 425 Riverhill Dr., Atlanta, Ga. 30328

[21] Appl. No.: 610,926

[22] Filed: Nov. 9, 1990

[51] Int. Cl.[5] .............................................. A47G 00/00
[52] U.S. Cl. .................................. 294/161; 294/151; 294/163; 211/49.1
[58] Field of Search ............... 294/137, 149, 150, 151, 294/159, 161, 162, 163, 172; 211/41, 49.1, 126, 133

[56] References Cited

U.S. PATENT DOCUMENTS

| | | |
|---|---|---|
| 953,007 | 3/1910 | Haller . |
| 1,065,633 | 6/1913 | Stone . |
| 1,519,874 | 12/1924 | Page . |
| 1,888,141 | 11/1932 | Ordh . |
| 2,087,375 | 7/1937 | Ehrhardt . |
| 2,531,543 | 11/1950 | Sutphen ........................ 211/41 X |
| 3,661,268 | 5/1972 | Boley ............................... 211/49.1 |
| 4,385,781 | 5/1983 | Welsch et al. . |
| 4,611,718 | 9/1986 | Cohn et al. ..................... 211/49.1 |
| 4,838,596 | 6/1989 | Stanfield . |
| 4,911,308 | 3/1990 | Nylund .............................. 211/41 |
| 4,923,236 | 5/1990 | Bunck ............................... 294/161 |

*Primary Examiner*—Margaret A. Focarino
*Assistant Examiner*—Dean J. Kramer
*Attorney, Agent, or Firm*—Kennedy & Kennedy

[57] ABSTRACT

A dish carrier 10 has a base 11, a cover 12, four stanchions 13 and flexible handles 42. The base is formed with four wedge shaped slots 34 through which the stanchions may extend. The wedge shaped slots are each straddled by track having divergent rails. The stanchions are slidably mounted to the base and rails to receive and straddle stacks of dishes of different sizes stacked upon the base.

6 Claims, 3 Drawing Sheets

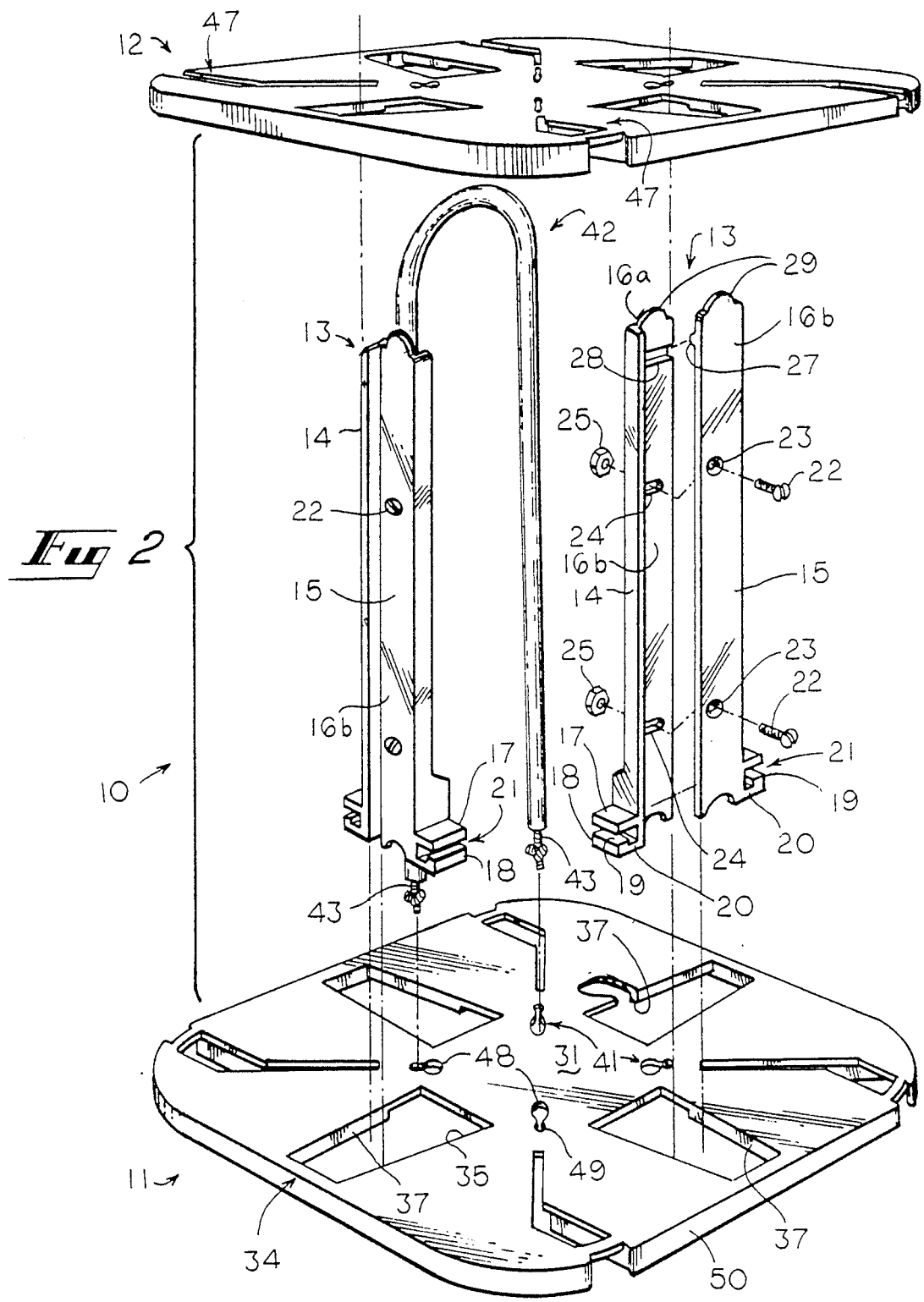

DISH CARRIER

TECHNICAL FIELD

This invention relates generally to carrying devices, and particularly to devices for carrying and storing dishes.

BACKGROUND OF THE INVENTION

It is common in the restaurant, tableware rental, food catering and moving industries for large numbers of plates or dishes to be stored and transported in stacks for economy of space and handling efficiency. Considerable difficulty can be encountered in handling stacks of dishes because they are fragile, heavy and cumbersome to handle. As a consequence, dishes are often dropped and breakage is common.

Previous attempts to solve the problems associated with transporting and storing large numbers of dishes have met only limited success. U.S. Pat. No. 2,087,375 exemplifies such prior art devices. It describes a carrying device that has upright staves connected by horizontal flexible members with a handle attached to the top of two of the staves. To use this type of carrying device, a number of plates are stacked on a surface and the device wrapped around the stack and fastened with latches attached to two of the upright staves.

Not only are devices of this type bulky and difficult to store, they require that plates be stacked on a surface before the device is applied. Wrapping such a device around a stack of plates however can itself be difficult and can cause the stack of plates to topple. The device also itself tends to obscure the plates making it difficult to inspect or count them without removal from the carrying device.

Plate racks such as those illustrated in U.S. Pat. Nos. 953,007 and 1,888,141 can also be used as dish carriers. They, however, are designed for carrying plates filled with food to be served with the plates therefore spaced from each other and thus not compactly arranged in stacks. Conversely, plate racks such as that illustrated in U.S. Pat. No. 4,838,596 are designed to carry stacks of empty plates nested one flushly atop the other. This rack has a base, a cover, a handle and four wire posts that extend through the base. However, its ability to adjust to different sized stacks of plates is limited. In the embodiment shown in FIGS. 10-12 adjustability is provided by the resilience and the bight width of the wire posts. In another embodiment shown in FIGS. 13-17 adjustability is provided by a multitude of parallel slots through which the wire bars extend. However, to adjust the wire posts to accommodate a selected sized plate the wire posts must be removed from the slots from below the base and reinserted into another slot. This necessitates that the base be freed of plates. Also, the spacing between two opposing wire post must also be accurately estimated for trial and error reconfiguration of the posts is time consuming.

Accordingly, it is seen that a need exists for a dish carrier on which a stack of dishes or plates may be more easily transported and stored in a simple and economic manner, with minimal risk of breakage, and which can be more quickly and easily adjusted to accommodate stacks of dishes of different sizes. It is to the provision of such a dish carrier therefore that the present invention is primarily directed.

SUMMARY OF THE INVENTION

In a preferred form of the invention, a dish carrier comprises a base having a central portion and several slots that extend outwardly from and about the central portion. A stanchion is slidably mounted in each of the slots. The base of each stanchion has two opposed side grooves in slidable engagement with a portion of the base that straddles the slot. The dish carrier also has means for rigidly mounting the stanchion to the base at selected distances from the central portion along the slots to accommodate and straddle stacks of dishes of different sizes stacked upon the base.

In another preferred form of the invention, a dish carrier comprises a base having an annular array of tracks with divergent rails. A stanchion is mounted on each of the tracks with each stanchion having a pair of sections each formed with a base which is slidably mounted upon and laterally captured by a track rail. The dish carrier also has means for releasably fastening the stanchion sections together at selected positions along the tracks at section base spacing widths that match the width of the track at the selected positions to immobilize the stanchions upon the track at those positions.

BRIEF DESCRIPTION OF THE DRAWINGS

FIG. 2 is an exploded view of the dish carrier of FIG. 1 without dishes and with some components of the carrier unshown for clarity of understanding.

DETAILED DESCRIPTION

Figure 1:
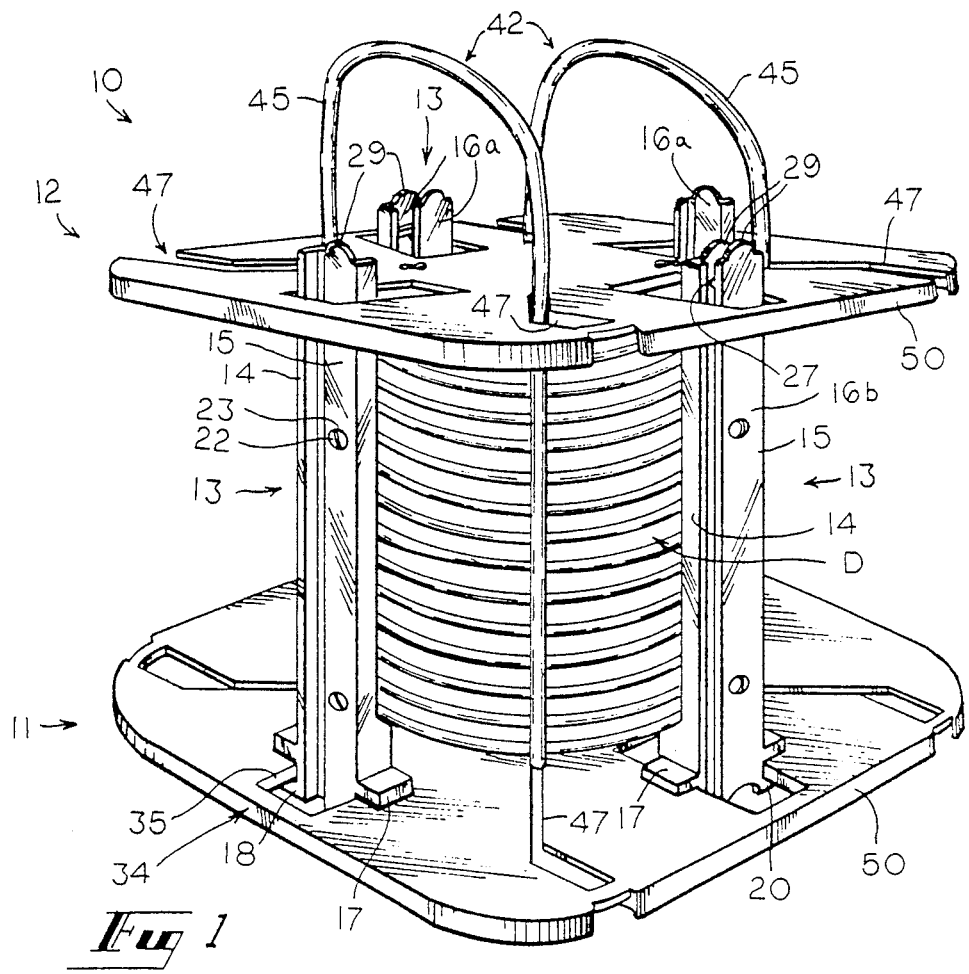
FIG. 1 is a perspective view of a dish carrier embodying principles of the invention in a preferred form shown supporting a stack of dishes for carrying or storage.
Figure 3:
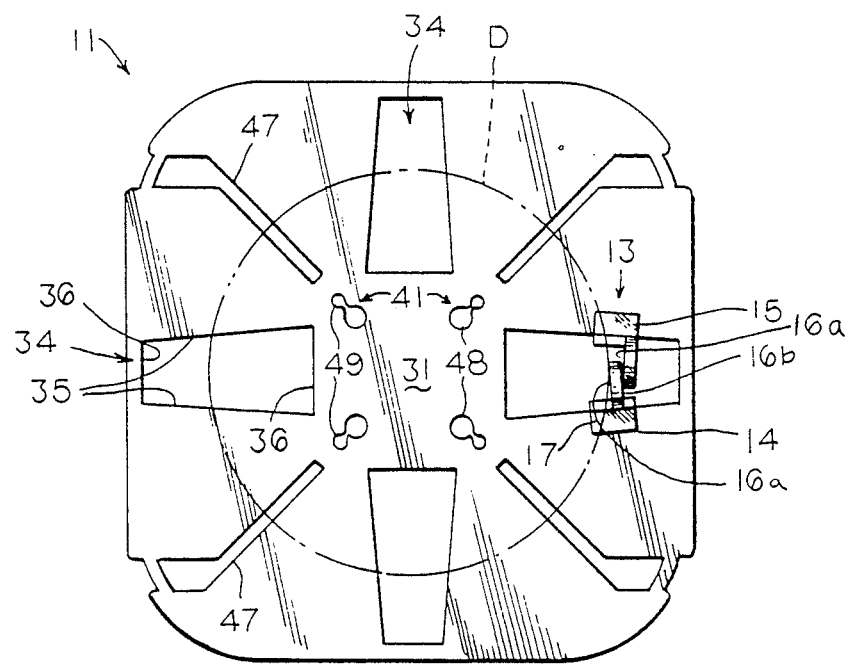
FIG. 3 is a top view of the base member of the dish carrier of FIG. 1 with a single stanchion shown mounted thereon.
Figure 4:
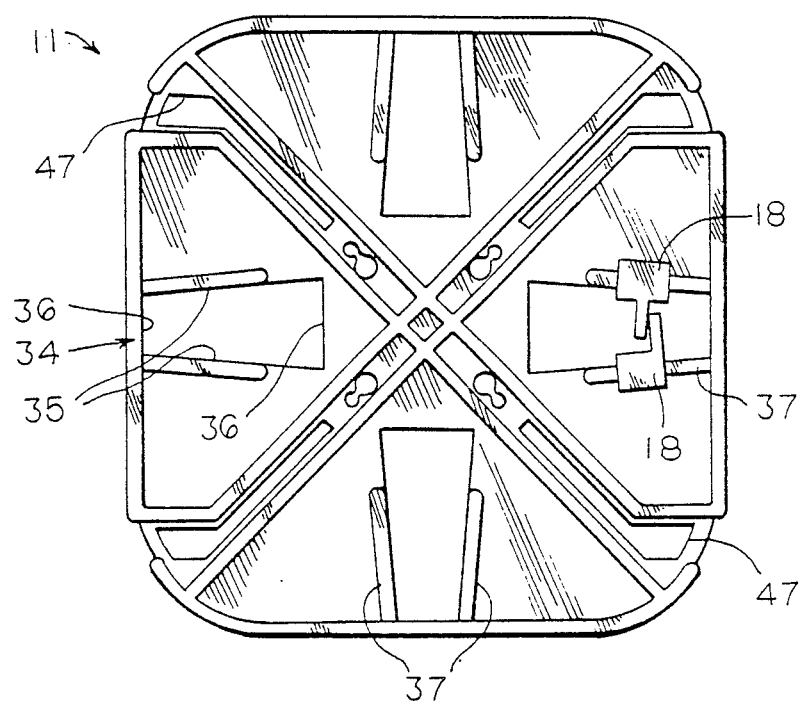
FIG. 4 is a bottom view of the base member of the dish carrier of FIG. 1 with a single stanchion shown mounted thereon.

With reference next in detail to the drawing, there is shown a dish carrier 10 having a base 11 and a cover 12 of substantially the same structure as that of the base. The dish carrier also has four stanchions 13 and two handles 42 that are all mounted on the base 11.

The base 11 has a central portion 31 and four wedge shaped slots 34 that extend outwardly from and about the central portion. Each slot 34 has two side walls 35 which diverge towards the central section 31 and two parallel opposite end walls 36. The base is formed with an annular array of track rails 37 on its bottom side that diverge towards the base central portion 31. The rails extend from the base bottom surface as coplanar extensions of slot side walls 35. Alternatively, they may be spaced slightly away from these side walls.

Pear or hourglass shaped handle mounting holes 41 are formed in the base central portion 31 each of which has a relatively large portion 48 and a relatively small portion 49. Base 11 also has four retention slots 47 that do not extend through the base side walls 50 which are located between the slots 34 aligned with the mounting holes 41. However, the cover 12 has three retention slots 47 which extend to the cover side walls 50 and one retention slot which does not extend to the cover side wall, this being the sole difference between the base and cover. A handle 42 is provided by two lengths of cord 43 knotted at their ends and overlaid by a length of flexible tubing 45, the knots are larger than the mounting hole small portions 49.

The stanchions 13 are bifurcated in that they have two separate components comprising an inner upright section 14 and an outer upright section 15. Each section has a flat inner surface 16a and an outer surface 16b. As best shown in FIG. 2, the base or foot of each stanchion section has an upper flange 17 and a lower flange 18 formed with an upright lip 19. The combination of the upper and lower flanges forms a L-shaped stanchion groove 21. A portion of the flange 20 is spaced beneath the upper flange 17 a distance sufficient to receive a rail 37.

Stanchions 13 each have a pair of mounting screws 22 which pass through an outer section countersunk hole 23, through an inner section slot 24 and are threaded into a nut 25. The outer section 15 has an alignment tongue 27 slidably mounted within an inner section alignment groove 28. The stanchion sections 14 and 15 also have dome-shaped protrusions 29 at their top ends and mating recesses 30 at their bottom ends.

FIG. 1 shows the dish carrier 10 in its assembled configuration with a stack of dishes D supported on its base 11 and covered by the cover 12 with the dishes nested between the four stanchions 13. The dishes are of a diameter such that they just contact the inner upright section 14 and thus are held firmly therebetween. The stanchions 13 are slidably mounted in the wedge shaped slots 34 with the stanchion upper flanges 17 overlaying the base top surface and the lower flanges 18 and lower flange lips 19 slidably capturing the base rails 37. The stanchions are rigidly mounted at their locations along the slot side walls 35 by sliding them into position upon the rail and then fixing the stanchion widths by tightening their mounting screws 22.

With the widths of the stanchions fixed their lower flange lips 19 abut the base rails 37 which prevents the stanchions from moving in either direction along the rails. In other words, with the span between the two side grooves of a stanchion fixed, its width can be neither increased nor decreased and thus cannot move on the rails that diverge in one direction and converge in the other.

The stanchions 13 are further rigidly held in place by a torquing force applied to their base grooves in tightening the mounting screws 22. As the inner section outer surfaces 16b are drawn flushly together with the outer section inner surface 16a by such tightening the ends of the L-shaped grooves 21 tend to bind against the rails 37 since they are not parallel and thus are slightly cocked with respect to the grooves.

If the dish carrier 10 is to be carried by handles, one end of a handle 42 is passed through the cover's only closed end retention slot 47 to link it to the base to prevent its separation and loss. The other handles 42 are attached to the base by passing their knots through the handle mounting hole large portions 48 and then sliding them under the smaller portions 49 which are smaller than the knots. A stack of plates P may then be stacked upon the base 11 and the cover placed atop the stack with the stanchions 13 extending freely through the cover slots 34. If the stanchions are not in abutment with the stack of plates, or if a different sized stack of plates is to be carried from that previously carried, the mounting screws 22 are loosened, the stanchions slid into contact with the stack and their screws retightened. The handles 42 are then forced into the cover retention slots 47 whereupon their flexible, covering tubings 45 become compressed which prevents the cover from raising off of the dishes. As the handles 42 are slid into the retention slots they are forced against the stack of dishes which further aids in preventing plate movement.

Once loaded, several of these dish carriers may be stacked one upon the other. In doing this the stanchion protrusions 29 of lower dish carriers are snugly mated with the stanchion recesses 30 of upper dish carriers. In this fashion several dish carriers may be stably stacked together with vertical alignment assured.

If desired, the rails 37, pairs of which form tracks, may be on the top surface of the base instead of on the bottom surface. In that event, the stanchion flanges are inverted so as to be slidably engaged with the rails. Also, the slot side walls 35 and the rails 37 may be oriented convergently as they extend towards the base central portion 31 instead of divergently.

It thus is seen that a dish carrier is now provided which may be easily and simply adjusted to accommodate different size dishes by simply loosening mounting screws, sliding its stanchions into position, and tightening the screws. Even though quite simple, the unique mounting arrangement of the stanchions is such that an extremely snug and sound fitting is achieved. Similarly, the handle construction is simple yet serves to hold the dishes securely in place.

It should be understood that the just described embodiment merely illustrate principles of the invention in a preferred form. Many modifications, additions and deletions may, in addition to that expressly recited, be made thereto without departure from the spirit and scope of the invention as set forth in the following claims.

I claim:

1. A dish carrier comprising a base having a central portion and a plurality of slots that extend outwardly from and about said central portion; a stanchion slidably mounted in each of said slots with each of said stanchions having two opposed side grooves in slidable engagement with a portion of said base that straddles said slot and with each of said stanchions having two elongated upright sections that overlap each other; and means for rigidly mounting said stanchions to said base at selected distances from said central portion along said slots to accommodate and straddle stacks of dishes of different sizes stacked upon said base which includes fastening means for releasably fastening said two sections to each other at different overlapping positions relative to each other for stanchion width variation, whereby the stanchions may be slid to selected locations along the slots and rigidly mounted to the base by spreading their sections into snug engagement with the portions of the base that straddle the slots and fastening the stanchion sections rigidly together.

2. The dish carrier of claim 1 wherein each of said stanchions has a lateral tongue on one of said elongated upright sections and a lateral groove on the other of said elongated upright sections in which said tongue is received for aligning the sections vertically relative to each other.

3. The dish carrier of claim 1 wherein said base is formed with pairs of divergent rails that straddle said slots, and wherein a portion of each of said stanchion side grooves is configured to receive said rail whereby establishment of the stanchion width determines and fixes its location along the slot.

4. The dish carrier of claim 1 wherein each of said stanchions has a protrusion on one end and a recess on the opposite end configured to receive and snugly mate with said protrusion, whereby the stanchion protrusion of one dish carrier may be fitted within the stanchion recess of another dish carrier of the same construction in stacking the dish carriers securely one upon another.

5. The dish carrier of claim 1 further comprising a cover of substantially the same construction as that of the base and thus having a plurality of cover slots that extend outwardly from and about a cover central portion, and wherein said stanchions extend through said cover slots.

6. The dish carrier of claim 1 wherein said base is formed with a set of retaining holes, and wherein said dish carrier further comprises a detachable handle comprised of a pair of cords with enlarged ends held to the bottom of said base adjacent said retaining holes.

* * * * *